(12) United States Patent
Hotta et al.

(10) Patent No.: US 10,439,233 B2
(45) Date of Patent: Oct. 8, 2019

(54) CONNECTOR UNIT FOR MATING WITH A CELL STACK OF A FUEL CELL

(71) Applicants: Tyco Electronics Japan G.K., Kanagawa (JP); Toyota Jidosha Kabushiki Kaisha, Aichi-ken (JP)

(72) Inventors: Daiji Hotta, Kanagawa (JP); Seiji Komatsu, Kanagawa (JP); Masahiro Imanishi, Aichi-ken (JP)

(73) Assignees: Tyco Electronics Japan G.K., Kanagawa (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 15/900,062

(22) Filed: Feb. 20, 2018

(65) Prior Publication Data

US 2018/0241051 A1    Aug. 23, 2018

(30) Foreign Application Priority Data

Feb. 22, 2017 (JP) .................................. 2017-030554

(51) Int. Cl.
*H01M 8/0247* (2016.01)
*H01R 13/514* (2006.01)
(Continued)

(52) U.S. Cl.
CPC ....... *H01M 8/0247* (2013.01); *H01M 8/2465* (2013.01); *H01R 13/10* (2013.01);
(Continued)

(58) Field of Classification Search
CPC .. H01M 8/0247; H01M 8/2465; H01R 13/10; H01R 13/40; H01R 13/514; H01R 13/627; H01R 13/6315
(Continued)

(56) References Cited

U.S. PATENT DOCUMENTS 3,848,951 A * 11/1974 Michaels ............. H01R 4/2429
439/357
4,580,861 A * 4/1986 Kaley .................. H01R 13/514
439/594

(Continued)

FOREIGN PATENT DOCUMENTS

EP    3104467 A1   12/2016
JP      59949 A    1/1984
(Continued)

OTHER PUBLICATIONS

Abstract of JP2013187050, dated Sep. 19, 2013, 2 pages.
(Continued)

*Primary Examiner* — Harshad C Patel
(74) *Attorney, Agent, or Firm* — Barley Snyder (57) ABSTRACT

A connector unit comprises a plurality of connector modules. Each connector module is coupled to an adjacent connector module in a first direction and is matable with a mating object in a second direction orthogonal to the first direction. Each connector module includes a holding portion holding a contact and a coupling portion positioned adjacent to the holding portion on an end side of the connector module in a third direction orthogonal to the first direction and the second direction. The coupling portion has a protrusion protruding toward the end side of the connector module, a concave part receiving the protrusion of the adjacent connector module, and a separation inhibiting part inhibiting separation of the protrusion of the adjacent connector module from the concave part. The connector modules coupled by the coupling portions are each displaceable in the first direction, the second direction, and the third direction.

16 Claims, 7 Drawing Sheets

(51) Int. Cl.
  *H01M 8/2465* (2016.01)
  *H01R 13/10* (2006.01)
  *H01R 13/40* (2006.01)
  *H01R 13/627* (2006.01)
  *H01R 13/631* (2006.01)

(52) U.S. Cl.
  CPC ........... *H01R 13/40* (2013.01); *H01R 13/514* (2013.01); *H01R 13/627* (2013.01); *H01R 13/6315* (2013.01)

(58) Field of Classification Search
  USPC .............................. 439/732, 717, 540, 541.5
  See application file for complete search history.

(56) References Cited

U.S. PATENT DOCUMENTS

| | | | | |
|---|---|---|---|---|
| 4,729,744 | A * | 3/1988 | Bet | H02B 1/26 439/717 |
| 5,122,077 | A | 6/1992 | Maejima et al. | |
| 5,288,251 | A * | 2/1994 | Sumida | H01R 13/514 439/701 |
| 5,895,296 | A * | 4/1999 | Okabe | H01R 13/514 439/701 |
| 6,193,550 | B1 * | 2/2001 | Yamashita | H01R 13/514 439/594 |
| 6,783,403 | B2 * | 8/2004 | Lafragette | H01R 4/4827 439/717 |
| 6,851,985 | B2 * | 2/2005 | Lafragette | H02B 1/26 439/701 |
| 7,413,481 | B2 * | 8/2008 | Redmond, III | H01R 13/514 439/49 |
| 7,572,156 | B2 * | 8/2009 | Schroll | H01R 13/514 439/717 |
| 7,674,133 | B2 * | 3/2010 | Fogg | H01R 13/6587 439/108 |
| 8,915,758 | B2 * | 12/2014 | Shishikura | H01R 13/506 439/701 |
| 2006/0084295 | A1 | 4/2006 | Laub et al. | |
| 2008/0003482 | A1 | 1/2008 | Komiyama et al. | |

FOREIGN PATENT DOCUMENTS

| | | |
|---|---|---|
| JP | 20113433 A | 1/2011 |
| JP | 2013187050 A | 9/2013 |
| JP | 2014154245 A | 8/2014 |

OTHER PUBLICATIONS

Abstract of JP2014154245, dated Aug. 25, 2014, 1 page.
Extended European Search Report, EP 18157740.4, dated Jul. 18, 2018, 11 pages.

* cited by examiner

CONNECTOR UNIT FOR MATING WITH A CELL STACK OF A FUEL CELL

CROSS-REFERENCE TO RELATED APPLICATION

This application claims the benefit of the filing date under 35 U.S.C. § 119(a)-(d) of Japanese Patent Application No. 2017-30554, filed on Feb. 22, 2017.

FIELD OF THE INVENTION

The present invention relates to a connector and, more particularly, to a connector for mating with a cell stack of a fuel cell.

BACKGROUND

A multi-position connector that is mated with a cell stack of a fuel cell is disclosed in Japanese patent application JP 2013-187050 A and Japanese patent application JP 2014-154245 A. The cell stack includes a plurality of cells. The connector includes a plurality of contacts and a housing that includes cavities respectively housing the contacts. The plurality of contacts are respectively connected to electrodes of the cells of the fuel cell.

Each of the contacts in the connector disclosed in JP 2014-154245 A has a first elastic connection portion, a second elastic connection portion, and a connection base. The first elastic connection portion sandwiches a plate-like first terminal part, the second elastic portion sandwiches a plate-like second terminal part, and the connection base couples these elastic connection portions to each other. JP 2014-154245 A discloses an example in which positive electrodes or negative electrodes of the adjacent cells are connected by the connector.

Positions of the respective cells in the cell stack are mutually deviated within a tolerance range due to dimensional error of a thickness and an outer shape of each of the cells of the fuel cell, an error in assembling the stacked cells, etc. Further, in on-vehicle fuel cells, each of the cells is deflected by vibration, which causes relative displacement of the cells. Even when the positions of the respective cells on right and left ends of the cell stack are fixed, the cells disposed between the cells on the both ends may be excessively displaced due to vibration or the like in the vertical, lateral, and front-rear directions.

To absorb such positional deviations of the cells by the connector, the respective cavities of the housing that house the contacts have wide clearances or allow the electrodes of the cells to be respectively inserted deeper into contacts of the housing with respect to the contact points of the contacts. When the clearances in the respective cavities are increased depending on the elastic deformation amounts of the contacts, the displacement of the cells can be absorbed by the elastic deformation of the contacts to some extent. This is similarly applied to the connector disclosed in JP 2014-154245 A including the elastic connection portion. The displacement, however, is accumulated in the cell thickness direction by the number of the cells relatively displaced. Therefore, absorption of the relative displacement of the cells by the elastic deformation of the contacts in the cavity is limited by a size of the connector. In addition, accumulation of the thickness tolerances of the plurality of cells may cause an excess load applied to the contacts and the cell electrodes, which may deteriorate connection reliability.

When the cell electrodes are respectively inserted deeper into the contacts as described above, the contact points respectively slide on the cell electrodes at the time of insertion or pulling-out and are likely to be worn, which may deteriorate connection reliability and inhibit downsizing of the connector. The contact points may be worn similarly in a case where distortion of the cell stack or deflection of the cells occurs in vibration and the contact points respectively slide on the cell electrodes in an in-plane direction of the cells. Sliding and deviation of the contact points from the prescribed positions of the cell electrodes can influence measurement accuracy based on signals detected through the contacts.

SUMMARY

A connector unit comprises a plurality of connector modules. Each connector module is coupled to an adjacent connector module in a first direction and is matable with a mating object in a second direction orthogonal to the first direction. Each connector module includes a holding portion holding a contact and a coupling portion positioned adjacent to the holding portion on an end side of the connector module in a third direction orthogonal to the first direction and the second direction. The coupling portion has a protrusion protruding toward the end side of the connector module, a concave part receiving the protrusion of the adjacent connector module, and a separation inhibiting part inhibiting separation of the protrusion of the adjacent connector module from the concave part. The connector modules coupled by the coupling portions are each displaceable in the first direction, the second direction, and the third direction.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A connector unit 1 according to the invention is shown in FIGS. 1-5. The connector unit 1 is mated with a plurality of cells 4 that configure a cell stack 40 of a fuel cell to be mounted on a vehicle. The flat plate-like cells 4 are connected in series to one another and separated by a plurality of separators. A side of the connector unit 1 mated with the cells 4 is referred to herein as a "front end side" and an opposite side thereto is defined as a "rear end side".

Figure 6:
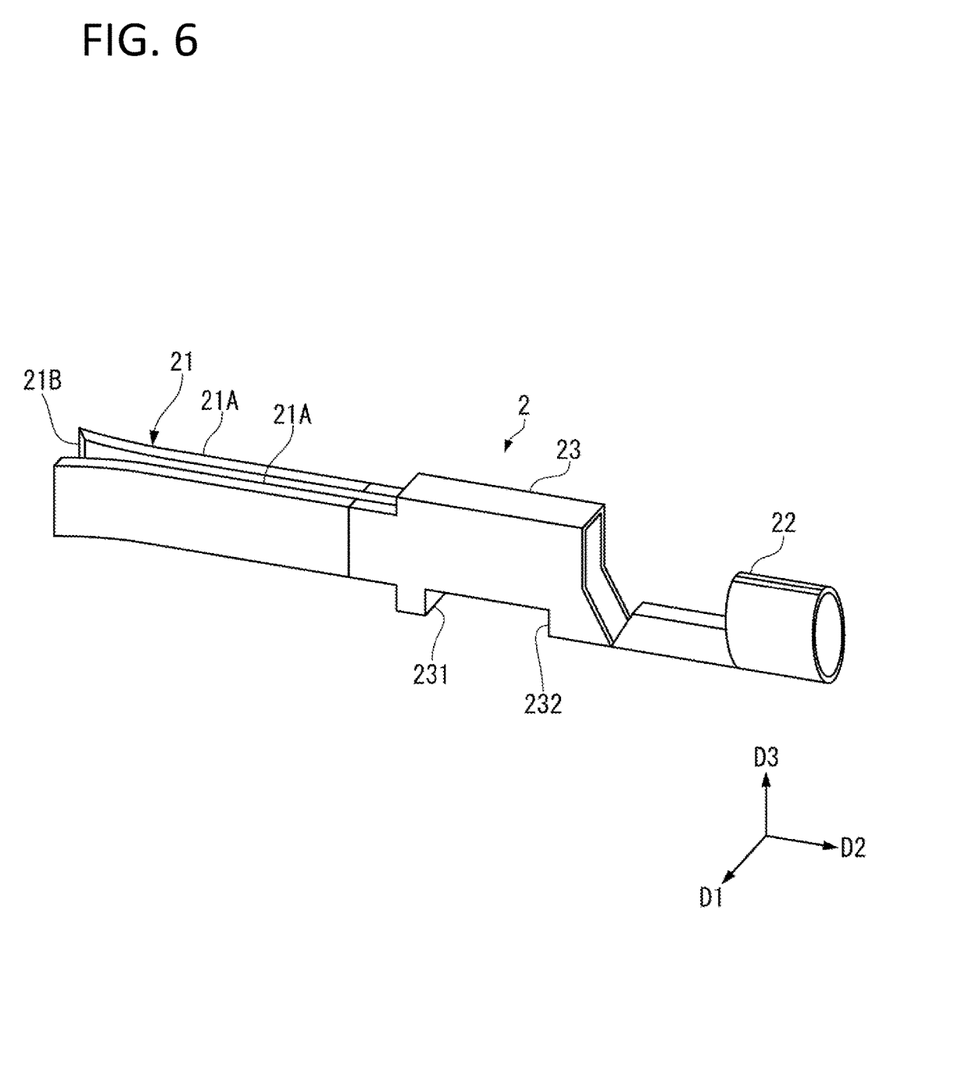
FIG. 6 is a perspective view of a contact disposed in the connector module.

Generated voltages of the cells 4 are detected by a plurality of contacts 2, shown in FIG. 6, that are provided in the connector unit 1 mated with the cell stack 40. It is possible to detect failure, etc. of the cells 4 and to control a supply amount of fuel gas and oxidizer gas, based on the detected voltages of the cells 4. The contact 2 shown in FIG. 6 comes into contact with and is electrically conducted with a voltage detection electrode 41 of the cell 4 shown in FIG. 7.

Each of the cells 4 includes an electrolyte film, an anode, and a cathode. The anode is provided on one surface side of the electrolyte film and the cathode is provided on an opposite surface side of the electrolyte film. The cells 4 are stacked in a thickness direction of the cells 4 with the separators interposed in between. The anode and the cathode are insulated by each of the separators between the adjacent cells. Each of the separators includes a passage to supply the fuel gas such as hydrogen gas to the anode and a passage to supply the oxidizer gas such as oxygen gas to the cathode. Each of the separators supports the sheet-like voltage detection electrode 41 shown in FIG. 7 that is electrically connected to the anode or the cathode. In the following, the voltage detection electrode 41 is referred to as the electrode 41.

In an embodiment, the cell stack 40 includes hundreds of cells 4 and the plurality of connector units 1 are mated with the whole of the cell stack 40. Another connector unit 1 of a similar configuration is disposed next to the connector unit 1 shown in FIG. 1 to mate with varying numbers of cells 4.

The contact 2 is connected to the electrode 41 of every other cell 4. In other embodiments, the contact 2 may be connected to the electrode 41 of every third or fourth cell 4. Alternatively, the contact 2 may be connected to the electrode 41 of each of the cells 4, and may detect the voltages of all cells 4.

Figure 7:
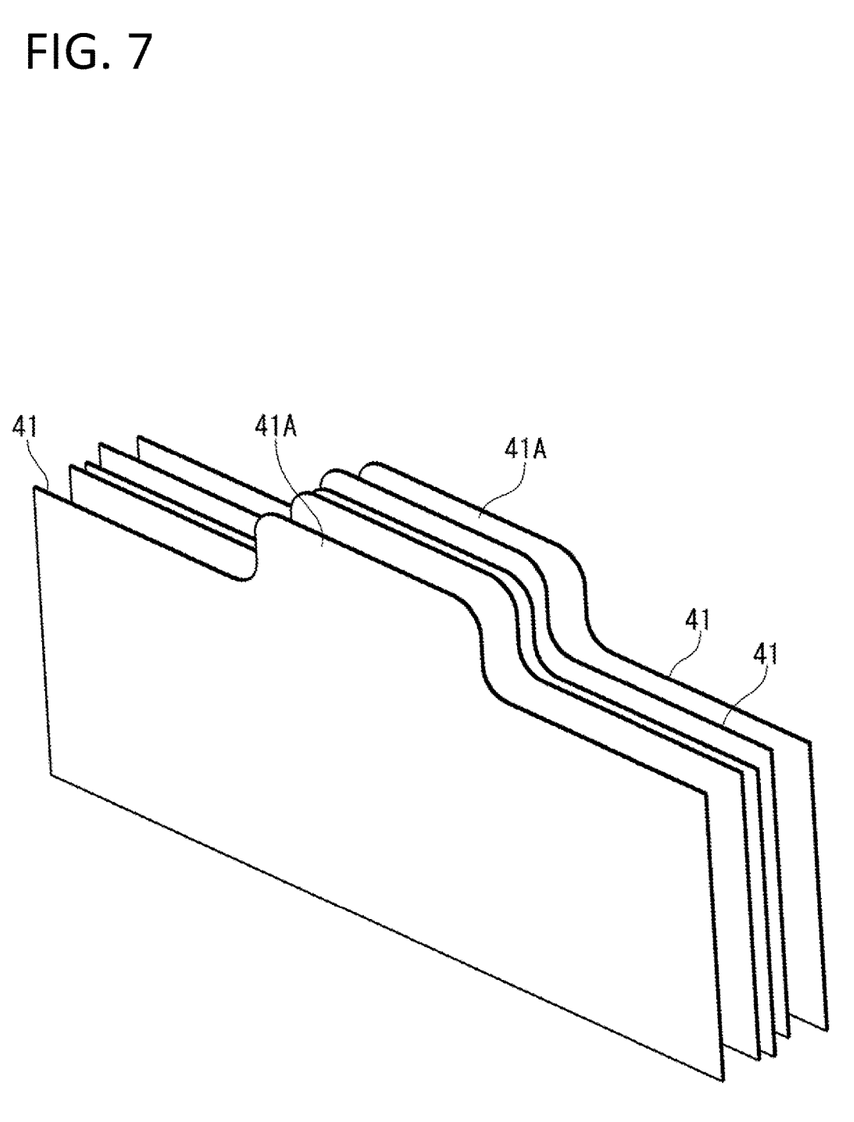
FIG. 7 is a perspective view of a voltage detection electrode of a cell of the cell stack.

Positions of the respective cells 4 in the cell stack 40 are each varied within a tolerance range due to dimensional error of a thickness and an outer shape of each of the cells 4, assembling error of members forming the cells 4, etc. Accordingly, the positions of the respective electrodes 41 of the plurality of cells 4 are mutually deviated. As shown in FIG. 7, the plurality of electrodes 41 are not disposed at equal intervals because of the mutual deviation in a thickness direction, and are also mutually deviated in a stacking direction and a height direction.

Figure 2:
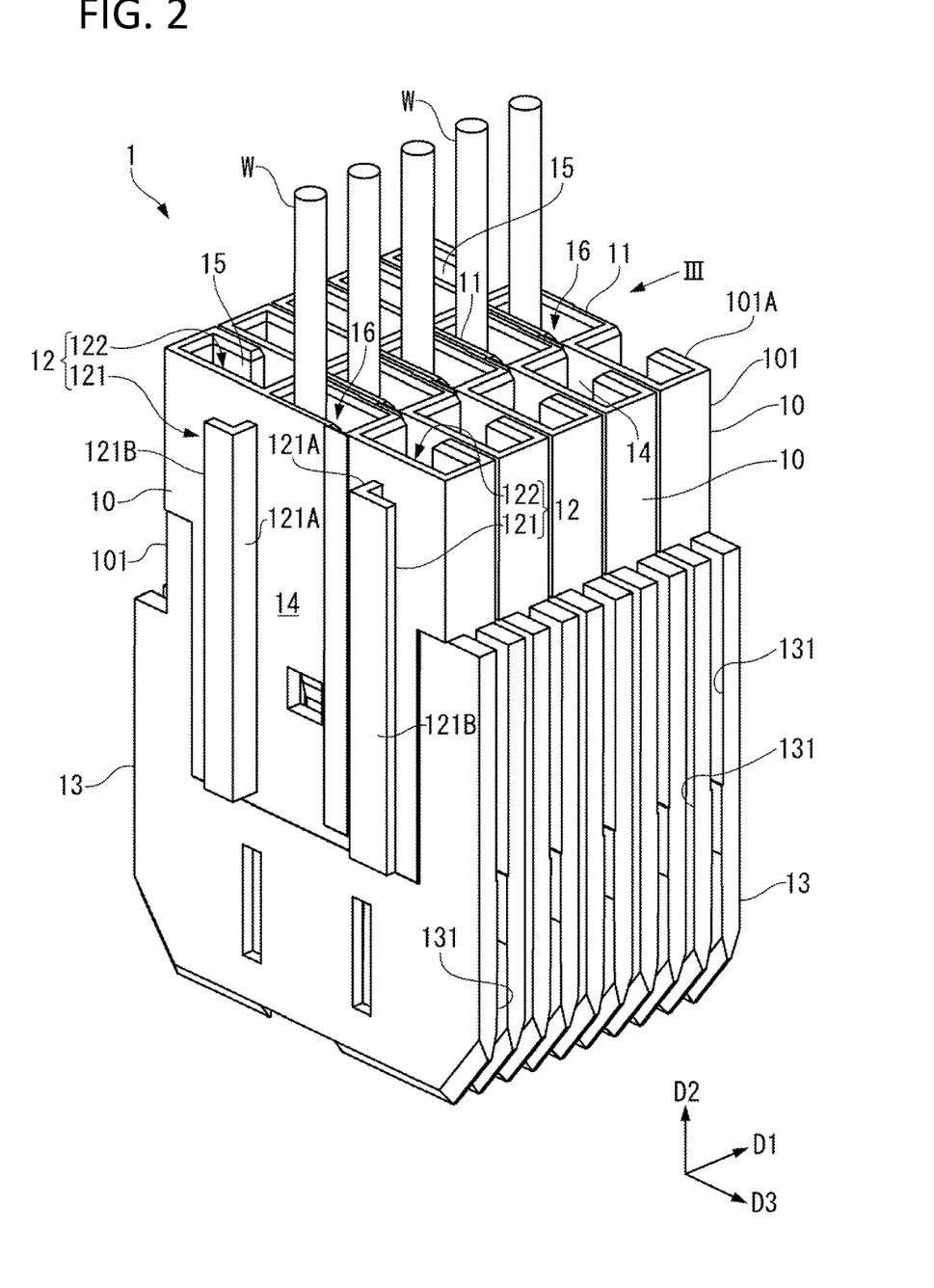
FIG. 2 is a perspective view of the connector unit.
Figure 3:
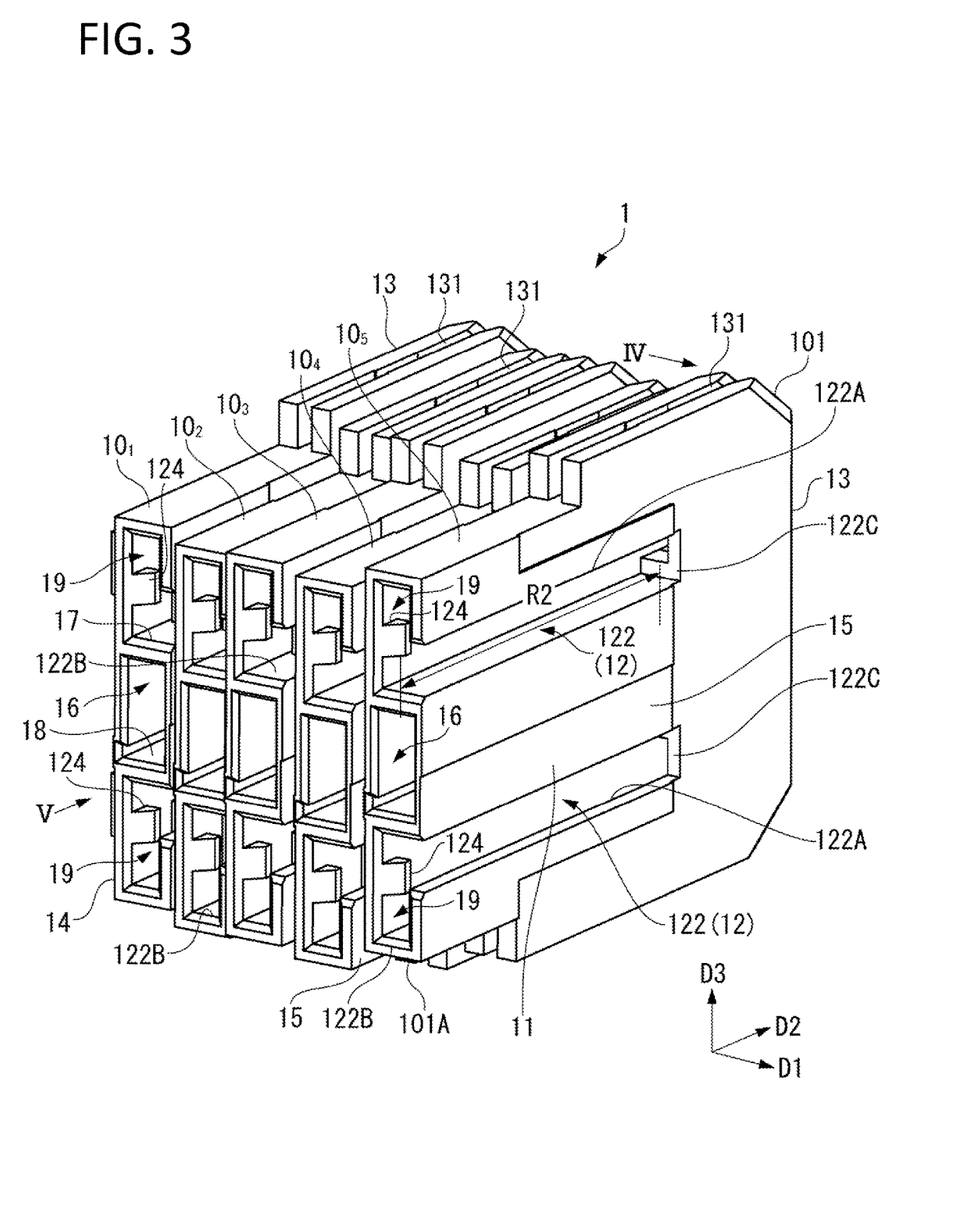
FIG. 3 is another perspective view of the connector unit.
Figure 5:
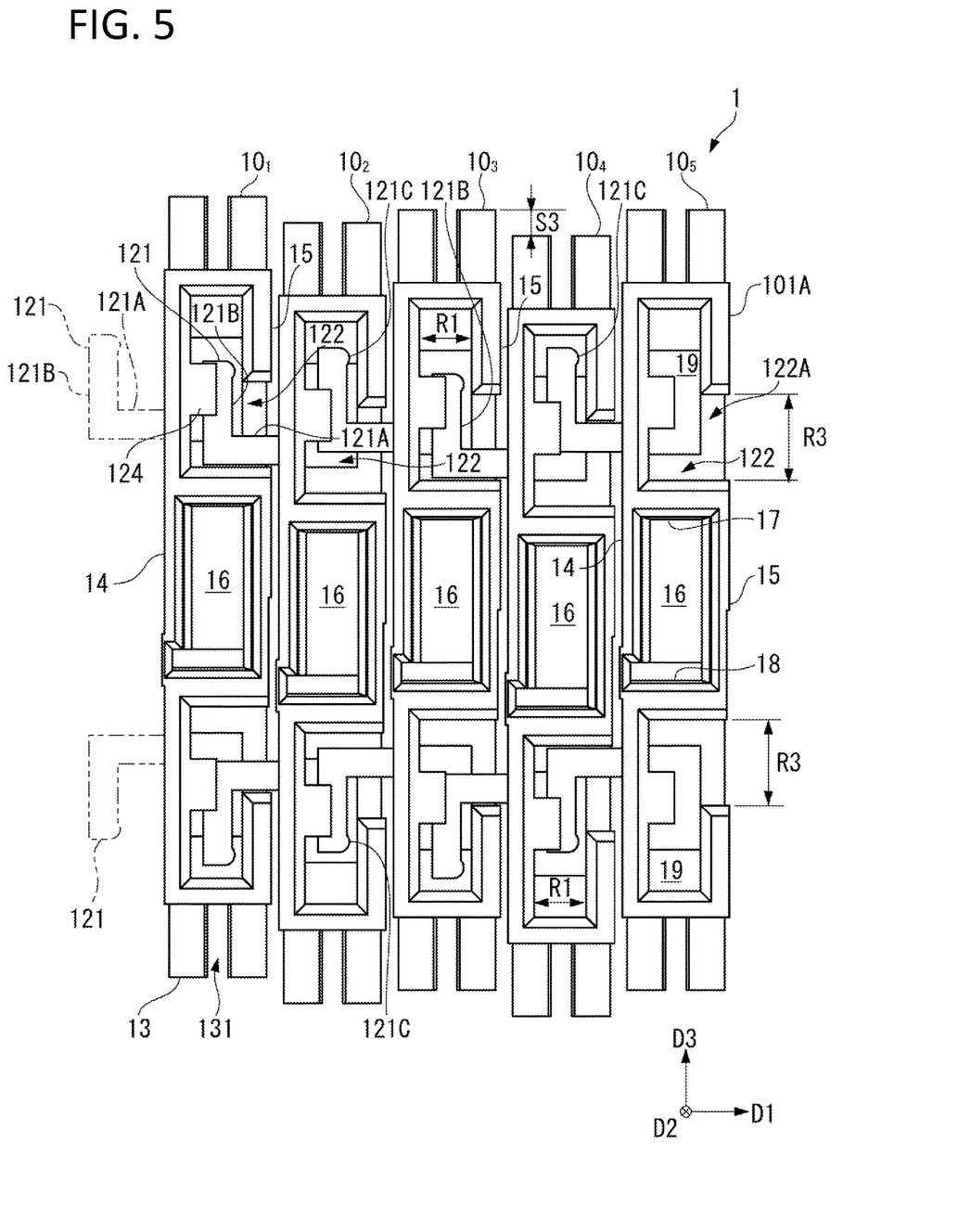
FIG. 5 is a side view of the connector unit.

The connector unit 1, as shown in FIGS. 2, 3, and 5, includes a plurality of connector modules 10. The plurality of connector modules 10 are stacked in a same direction as the direction in which the cells 4 are stacked. Each of the connector modules 10 corresponds to a single-position connector including a single contact 2. The connector modules 10 adjacent in the stacking direction are coupled and integrated to one another to configure the multi-position connector unit 1. In other embodiments, each of the connector modules has two or more contacts 2.

The plurality of coupled connector modules 10 are not fixed to one another, and are relatively displaceable by a displacement amount. The displacement amount corresponds to at least the tolerance of each of the cells 4. In an embodiment, the displacement amount is equal to or larger than the tolerance of each of the cells 4 in consideration of vibration that is applied to the cell stack 40 during driving of the vehicle.

In the following, the direction in which the connector modules 10 are stacked is referred to as a lateral direction D1 (first direction), and the direction in which the connector unit 1 is mated with the cell stack 40 is referred to as a front-rear direction D2 (second direction), as shown in FIGS. 3 and 5. A direction orthogonal to both of the lateral direction D1 and the front-rear direction D2 is referred to as a vertical direction D3.

The plurality of coupled connector modules 10 are individually displaceable in any of the lateral direction D1, the front-rear direction D2, and the vertical direction D3, to deal with the positional deviation of the electrodes 41 of the respective cells 4.

Figure 4:
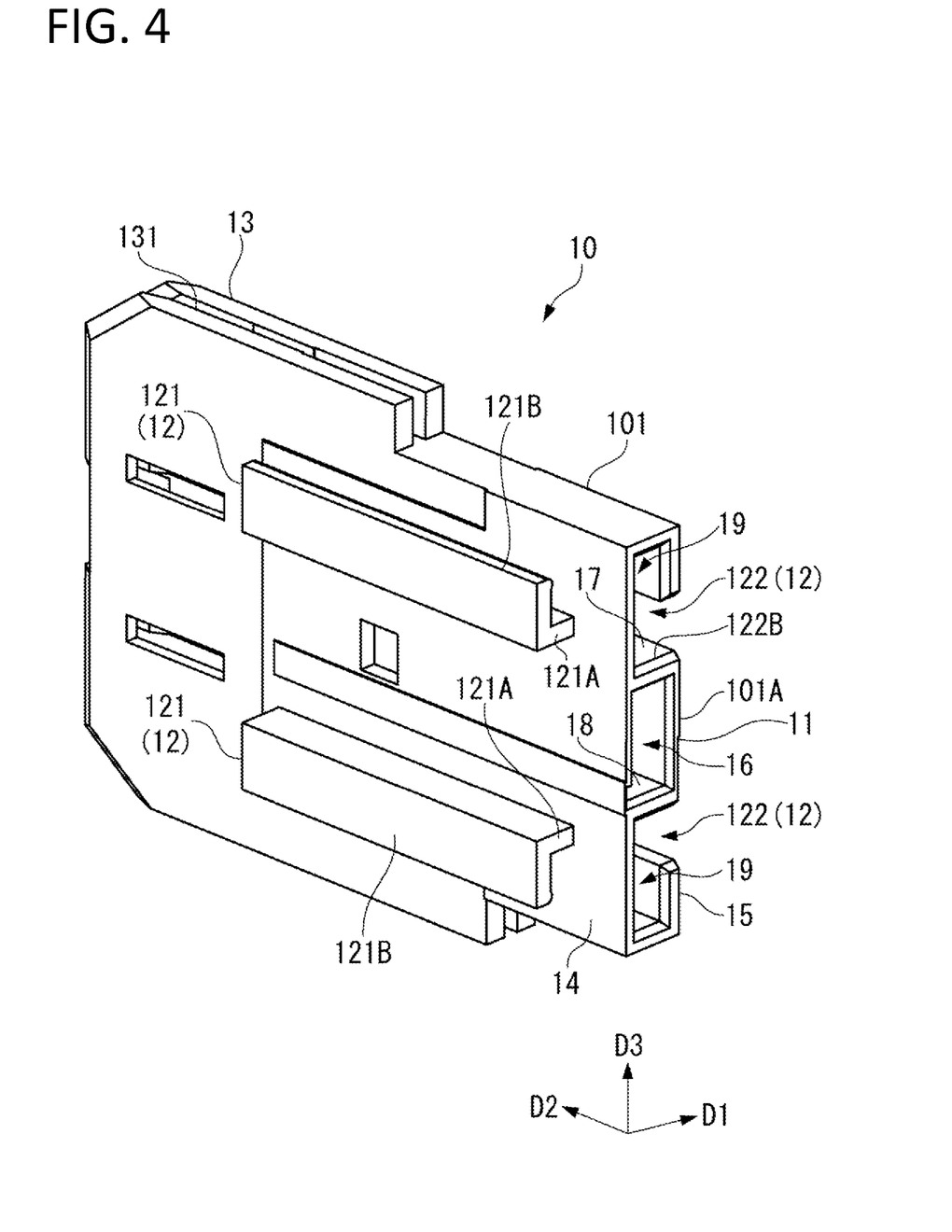
FIG. 4 is a perspective view of a connector module of the connector unit.

A connector module 10 of the plurality of connector modules 10 is shown in FIGS. 3 and 4. The connector module 10 includes the contact 2 and a module housing 101.

Figure 1:
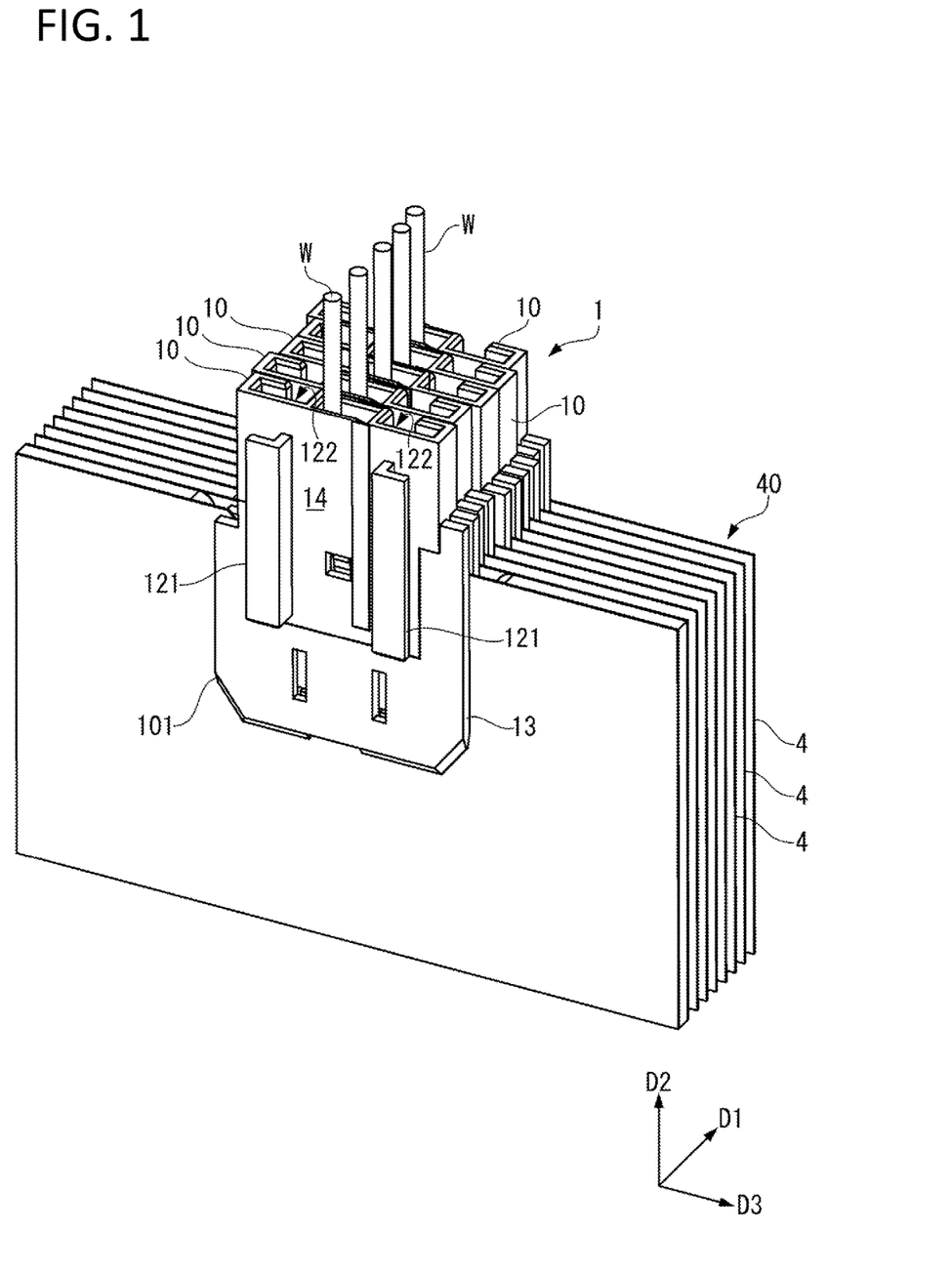
FIG. 1 is a perspective view of a connector unit mated with a cell stack of a fuel cell.

The contact 2, as shown in FIG. 6, is formed of a metal material having elasticity and includes a contact portion 21, an electric wire attaching portion 22 to which an electric wire W shown in FIGS. 1 and 2 is crimped, and an intermediate portion 23. The contact portion 21 sandwiches the electrode 41 between a pair of strip-like contact beams 21A, 21A, and the intermediate portion 23 is positioned between the contact portion 21 and the electric wire attaching portion 22. A gap between the contact beams 21A, 21A of the contact portion 21 is larger than a plate thickness of the electrode 41 on front end 21B side of the contact portion 21, and a connection region 41A of the electrode 41 is inserted between the contact beams 21A, 21A from the front end 21B side. Contact points set in the contact beams 21A, 21A respectively come into contact with front and rear surfaces of the inserted connection region 41A of the electrode 41 at a predetermined contact pressure.

The module housing 101, as shown in FIGS. 3 and 4, is injection molded from an insulating resin material. The module housing 101 includes two side walls 14 and 15 that face each other in the lateral direction D1, and has a substantially plate-like overall outer shape. The module housing 101 has a plate thickness of, for example, several mm.

The module housing 101 includes a holding portion 11, a pair of coupling portions 12, 12, and a mated portion 13. The holding portion 11 houses and holds the contact 2. The pair of coupling portions 12, 12 are coupled to the adjacent connector modules 10. The mated portion 13 is mated with the cell 4, as shown in FIG. 1.

The holding portion 11, as shown in FIGS. 3 and 4, is positioned between the coupling portions 12, namely, at a center of the module housing 101 in the vertical direction D3 and houses the contact 2, holding the intermediate portion 23 of the contact 2. The holding portion 11 includes the side walls 14 and 15, a top wall 17, and a bottom wall 18 so as to surround a cavity 16 in which the contact 2 is disposed. Protrusions or steps 231 and 232 provided on the intermediate portion 23 of the contact 2 engage with engaging portions provided on the top wall 17 or the bottom wall 18 and the contact 2 is held by the holding portion 11. The cavity 16 penetrates through the module housing 101 in the front-rear direction D2. The electrical wire W connected to the contact 2 is drawn out from rear end 101A side of the module housing 101.

The mated portion 13 is positioned at the front end of the connector module 10 and is mated with the cell 4, as shown in FIG. 1, while receiving a portion of the separator of the cell 4 and a portion of the electrode 41. A groove 131 that receives the connection region 41A of the electrode 41 and a predetermined region of the separator is provided in the mated portion 13.

When the plurality of connector modules 10 are coupled to one another, the mated portions 13 of the respective connector modules 10 are arranged in a comb-tooth shape. An upper end part of the separator and the connection region 41A are inserted respectively into the groove 131 of each of the mated portions 13 of the plurality of connector modules 10, which positions the contact portion 21 of the contact 2 of each of the connector modules 10 with respect to the connection region 41A. The connection region 41A protrudes from one side of the electrode 41 with a width equivalent to the width of the contact portion 21 (dimension in vertical direction D3). A prescribed connection part with which the contact point of the contact 2 comes into contact is set in the connection region 41A.

The connector unit 1 shown in FIG. 3 is manufactured by assembling connector modules 101 to 105 in order from left side toward right side; assembling the connector module 101 positioned at left end in FIG. 3 and the connector module 102 adjacent on right side thereof, and then assembling the connector module 102 and the connector module 103 adjacent on right side thereof.

The coupling portions 12 of the connector module 10, as shown in FIGS. 3 and 4, are provided symmetrically in the vertical direction on both end sides of the holding portion 11 that is located at the center of the module housing 101 in the vertical direction D3. Each of the coupling portions 12 includes a protrusion 121 and a concave part 122. The pen-protrusion 121 protrudes toward one end side in the lateral direction D1. The concave part 122 receives the protrusion 121 of the connector module 10 adjacent on the other end side in the lateral direction D1. The protrusion 121 includes a separation inhibiting part 121B that inhibits separation of the protrusion 121 from the concave part 122.

The protrusion 121 of one of the connector modules 10 and the concave part 122 of the other connector module 10 that receives the protrusion 121 loosely engage with each other. Therefore, as described above, the plurality of coupled connector modules 10 are individually displaceable in any of the lateral direction D1, the front-rear direction D2, and the vertical direction D3. The positions of the connector modules 10 (101 to 105) shown in FIG. 1, FIG. 3, and FIG. 5 are mutually shifted by the deviation of the positions of the electrodes 41 of the cells 4. The protrusion 121 protrudes from the side wall 14 of the connector module 10, as shown in FIG. 4. The separation inhibiting part 121B of the protrusion 121 is disposed between the side walls 14 and 15 of the adjacent connector module 10.

It is possible to omit formation of the protrusion 121 for the connector module 10 disposed on the end part of the connector unit 1 in the lateral direction D1, as shown in FIG. 5. As a result, in a case where the plurality of connector units 1 are mated with the cell stack 40, a working sequence of mating the connector units 1 is not restricted because the connector units 1 are not coupled to one another. In other words, it is unnecessary to mate the plurality of connector units 1 with the cell stack 40 in a predetermined order from the left side toward the right side, which improves workability. It is possible to detach only some of the connector units 1 because the connector units 1 are not coupled to one another, which facilitates replacement of only the failed connector unit 1.

The cavity 16 and a pair of sections 19, 19 are provided between the side walls 14 and 15. The contact portion 21 and the intermediate portion 23 of the contact 2 are positioned in the cavity 16. The pair of sections 19 are respectively positioned above and below the cavity 16, and the separation inhibiting part 121B of the upper coupling portion 12 and the separation inhibiting part 121B of the lower coupling portion 12 are respectively positioned in the pair of sections 19. The cavity 16 and the upper section 19 are partitioned by the top wall 17, and the cavity 16 and the lower section 19 are partitioned by the bottom wall 18.

The concave part 122 extends along the front-rear direction D2; the direction in which the connector module 10 is mated with the cell 4. The concave part 122 includes a slit opening 122A provided in the side wall 15 and one of the sections 19 as shown in FIG. 3. A dimension of the opening 122A in the vertical direction D3 is made smaller than a dimension of each of the sections 19 in the vertical direction D3. The opening 122A penetrates through the side wall 15 in the thickness direction, at a position near the cavity 16. The opening 122A is provided along the front-rear direction D2 from the rear end position of the side wall 15. The rear end of the concave part 122 is opened, and serves as an insertion port 122B into which the protrusion 121 is inserted. A stopper protrusion 124 is provided at the rear end 101A of the module housing 101 at which the insertion port 122B is positioned. The stopper protrusion 124 inhibits rearward separation of the protrusion 121 inserted into the concave part 122. A front end of the concave part 122 is closed and includes a stopper wall 122C.

The protrusion 121, as shown in FIG. 4, extends along the front-rear direction D2 and has a substantially L-shaped cross-sectional shape. The protrusion 121 includes a penetration part 121A and the separation inhibiting part 121B. The penetration part 121A is put though the opening 122A of the concave part 122. The separation inhibiting part 121B is housed inside the concave part 122. The separation inhibiting part 121B is bent toward a direction separating from the cavity 16, along the vertical direction D3, with respect to the penetration part 121A extending along the lateral direction D1.

The cross-sectional shape of the protrusion 121 is formed in the substantially L-shape by the penetration part 121A and the separation inhibiting part 121B. The upper protrusion 121 and the lower protrusion 121 are disposed symmetrically in the vertical direction about the cavity 16. The cross-sectional shape of the protrusion 121 is not limited to the L-shape, and may be a T-shape, etc. in other embodiments. In the case of the T-shape, the separation inhibiting part 121B extends toward the cavity 16 relative to the distal end of the penetration part 121A. In other embodiments, each of the connector modules 10 may have a configuration in which the separation inhibiting parts 121B of the upper protrusion 121 and the lower protrusion 121 both extend upward from the penetration part 121A. In other embodiments, the separation inhibiting part may be separate from the penetration part 121A of the protrusion 121.

The holding portion 11 is positioned at the center of the module housing 101 in the vertical direction D3 and the coupling portions 12 are positioned on the both end sides relative to the holding portion 11 in the vertical direction D3. Therefore, it is possible to stably couple the adjacent connector modules 10 by the protrusions 121 and the concave parts 122 of the coupling portions 12, as compared with a case where the coupling portion 12 is positioned only on the upper side or the lower side of the holding portion 11.

The separation inhibiting part 121B of the upper protrusion 121 and the separation inhibiting part 121B of the lower protrusion 121 both extend from the respective penetration parts 121A in the direction separating from the cavity 16.

Accordingly, distal ends 121C of the two protrusions 121, shown in FIG. 5, are positioned on the outer end side of the connector module 10 in the vertical direction D3, as compared with a case where the separation inhibiting part 121B of the upper protrusion 121 and the separation inhibiting part 121B of the lower protrusion 121 both extend from the respective penetration parts 121A in the opposite direction, namely, in a direction extending toward the cavity 16. The distal end 121C of the protrusion 121 abuts on the side wall 15 on the outer end side of the connector module 10 in the vertical direction D3 when a force to open a gap between the adjacent connector modules 10 acts on the upper side or the lower side, which makes it possible to sufficiently inhibit inclination of the connector module 10. The distal end 121C of the protrusion 121 supporting the side wall 15 has a semispherical shape in the shown embodiment.

In another embodiment, the connector module 10 may have a configuration such that the separation inhibiting part 121B of the upper protrusion 121 and the separation inhibiting part 121B of the lower protrusion 121 both extend from the respective penetration parts 121A in the direction opposite to the direction of the present embodiment, namely, in the direction extending toward the cavity 16.

When the adjacent connector modules 10 are assembled to each other, the protrusion 121 of one of the connector modules 10 is inserted into the concave part 122 from the insertion port 122B of the other connector module 10 by moving over the stopper protrusion 124. The protrusion 121 is slid along the front-rear direction D2 to dispose the separation inhibiting part 121B inside the concave part 122. As shown in FIG. 5, the separation inhibiting part 121B of the connector module 104 is overlapped with the side wall 15 of the connector module 103 in the vertical direction D3 even in the state where the connector module 103 and the connector module 104 are relatively displaced at a maximum in the vertical direction D3. Therefore, the separation inhibiting part 121B stays inside the concave part 122 because the separation inhibiting part 121B does not climb over the side wall 15 in the lateral direction D1 and come outside of the concave part 122. Accordingly, the separation inhibiting part 121B inhibits separation of the protrusion 121 from the concave part 122. When the separation of the protrusion 121 from the concave part 122 is inhibited, the adjacent connector modules 10 are not separated from each other and are maintained in the coupled state.

The protrusion 121 inserted into the concave part 122 is displaceable in the front-rear direction D2 within a predetermined range R2 shown in FIG. 3. The range R2 corresponds to a distance between the stopper protrusion 124 and the stopper wall 122C, and is longer than the dimension of the protrusion 121 in the front-rear direction D2. The protrusion 121 is provided with a movable range that is obtained by subtracting the dimension of the protrusion 121 from the distance (range R2) between the stopper protrusion 124 and the stopper wall 122C, in the front-rear direction D2. One of the adjacent connector modules 10 is displaceable within the range R2, with respect to the other connector module 10, by the displacement amount that is set in consideration of the estimated deviation amount of the cell 4 in the front-rear direction D2.

The displacement in the lateral direction D1 and the vertical direction D3 is described with reference to FIG. 5.

As shown in FIG. 5, a width of each of the sections 19 in the lateral direction D1, also a distance between the side walls 14 and 15, is larger than the plate thickness of the separation inhibiting part 121B of the protrusion 121 disposed in each of the sections 19. Therefore, the protrusion 121 is displaceable in the lateral direction D1 within a range R1 corresponding to the width of each of the sections 19. The protrusion 121 is provided with the movable range that is obtained by subtracting the plate thickness of the separation inhibiting part 121B from the width of the section 19 in the lateral direction D1. The adjacent connector modules 10 are displaceable by the displacement amount set in the lateral direction D1, within the range R1.

A height of the opening 122A of the concave part 122 in the vertical direction D3 is larger than the plate thickness of the penetration part 121A of the protrusion 121. Accordingly, the protrusion 121 is displaceable in the vertical direction D3 within a range R3 corresponding to the height of the opening 122A. The protrusion 121 is provided with the movable range that is obtained by subtracting the plate thickness of the penetration part 121A from the height of the opening 122A in the vertical direction D3.

In the state shown in FIG. 5, the connector modules 101-105 are relatively displaced individually in the vertical direction D3 due to deviation of the positions of the cells 4 respectively corresponding to the connector modules 101-105 in the vertical direction D3.

For example, when the cell 4 to which the contact 2 of the connector module 103 is connected and the cell 4 to which the contact 2 of the connector module 104 is connected are deviated in the vertical direction D3, the connector modules 103 and 104 are displaced in the vertical direction D3 by a displacement amount S3 that corresponds to the deviation amount between the cells 4 so as to follow the positions of the respective cells 4. In other words, the positional deviation due to the tolerance of the cell 4 and the positional deviation of the cell 4 due to vibration are absorbed by the relative displacement of the connector modules 103 and 104. This eliminates the necessity of setting an excess clearance between the contact 2 and the inner surface of the cavity 16 in the vertical direction D3 in consideration of the positional deviation. In addition, the connector module 103 and the connector module 104 are freely and relatively displaced up to the displacement amount S3 that is set corresponding to the positional deviation amount of the cell 4. This makes it possible to prevent the contact point of the contact 2 from sliding on the electrode 41 of the cell 4.

The displacement amount S3 is also limited by the fact that the displacement of the protrusion 121 with respect to the opening 122A of the concave part 122 is limited within the range R3. Therefore, the connector module 103 and the connector module 104 cannot be excessively displace relative to one another. This makes it possible to prevent the contact 2 and the module housing 101 from being damaged by an excess relative displacement.

The same applies to the lateral direction D1 and the front-rear direction D2. When the stacked cells 4 are positionally deviated in the direction separating from each other or coming close to each other in the lateral direction D1 due to the tolerance or vibration, the plurality of connector modules 10 are relatively displaced in the lateral direction D1 to absorb the positional deviation of the cells 4. The plurality of connector modules 10 are freely and individually displaceable by the predetermined displacement amount, which makes it possible to secure connection reliability without applying excess force to the contact 2 and the electrode 41. Moreover, it is unnecessary to consider accumulation of the tolerance of the cells 4 in the lateral direction D1. Furthermore, it is possible to minimize each clearance between the contact 2 and the side walls 14 and 15 forming the cavity 16, which makes it possible to contribute to downsizing of the connector unit 1 that is made up of the coupled thin connector modules 10.

As for the front-rear direction D2, when the stacked cells 4 are positionally deviated in the front-rear direction D2 due to the tolerance or vibration, the plurality of connector modules 10 are relatively displaced in the front-rear direction D2 to absorb the positional deviation of the cells 4. Also in this case, the plurality of connector modules 10 are freely and individually displaceable by the predetermined displacement amount, which makes it possible to prevent the contact point of the contact 2 from sliding on the electrode 41 of the cell 4. This allows for securement of connection reliability. Further, it is unnecessary to increase a length of the contact 2 such that the electrode 41 is inserted deeply into the contact 2. Therefore, it is possible to downsize the module housing 101 in the front-rear direction D2 in which the contact 2 extends, and to decrease the distance in which the contact 2 and the electrode 41 slide when the contact 2 is inserted or pulled out. This makes it possible to suppress abrasion of the contact point.

The connector unit 1 according to the present embodiment deals with the positional deviation of the cell 4 in all directions that are combinations of two or more of the lateral direction D1, the front-rear direction D2, and the vertical direction D3. For example, when the cell 4 is deflected in out-of-plane direction or the cell stack 40 is deformed so as to be distorted in a rotation direction of the lateral direction D1, the plurality of connector modules 10 are relatively displaced individually in the three directions D1, D2, and D3, which makes it possible to suppress deviation of the positions of the contact points from the respective prescribed positions on the electrodes 41 of the cells 4. As a result, the contact point of the contact 2 come into contact with a fixed position of the electrode 41 in each of the cells 4. This makes it possible for the contact 2 to stably detect the voltage of the connected cell 4, and to improve measurement accuracy.

What is claimed is:

1. A connector unit, comprising:
   a plurality of connector modules, each connector module being coupled to an adjacent connector module in a first direction, matable with a mating object in a second direction orthogonal to the first direction, and including:
      a holding portion holding a contact; and
      a coupling portion positioned adjacent to the holding portion on an end side of the connector module in a third direction orthogonal to the first direction and the second direction, the coupling portion including:
   a protrusion protruding toward the end side of the connector module;
   a concave part receiving the protrusion of the adjacent connector module; and
   a separation inhibiting part inhibiting separation of the protrusion of the adjacent connector module from the concave part, the connector modules coupled by the coupling portions are each displaceable in the first direction, the second direction, and the third direction.

2. The connector unit of claim 1, wherein the coupling portion is positioned on each of two opposite end sides of the connector module and on two opposite sides of the holding portion in the third direction.

3. The connector unit of claim 1, wherein the concave part extends in the second direction.

4. The connector unit of claim 3, wherein each of the connector modules is displaceable with respect to the adjacent connector module within a movable range in the second direction along the concave part.

5. The connector unit of claim 4, wherein the concave part is open on a rear end side of the connector module in the second direction.

6. The connector unit of claim 5, wherein each connector module is assembled to the adjacent connector module by inserting the protrusion into the concave part from an insertion port at the rear end side of the concave part and sliding the protrusion along the second direction.

7. The connector unit of claim 1, wherein the protrusion includes a penetration part and the separation inhibiting part.

8. The connector unit of claim 7, wherein the penetration part penetrates an opening of the concave part in the first direction and has a movable range in the third direction with respect to the concave part.

9. The connector unit of claim 8, wherein the separation inhibiting part is disposed inside the concave part.

10. The connector unit of claim 9, wherein the penetration part and the separation inhibiting part form an L-shaped cross-section of the protrusion.

11. The connector unit of claim 2, wherein the holding portion is positioned at a center of the connector module in the third direction.

12. The connector unit of claim 1, wherein the connector module includes a pair of side walls facing each other in the first direction.

13. The connector unit of claim 12, wherein the protrusion protrudes from a first side wall of the pair of side walls.

14. The connector unit of claim 13, wherein the contact and the separation inhibiting part of the adjacent connector module are disposed between the pair of side walls.

15. The connector unit of claim 1, wherein at least one of the connector modules in the connector unit does not have a protrusion and faces an exterior of the connector unit.

16. The connector unit of claim 1, wherein the mating object is a plurality of cells forming a cell stack of a fuel cell.

* * * * *